United States Patent
Smith (10) Patent No.: US 10,274,924 B2
(45) Date of Patent: Apr. 30, 2019

(54) SYSTEM AND METHOD FOR DOCKING AN ACTIVELY STABILIZED PLATFORM

(71) Applicant: Sharp Laboratories of America, Inc., Camas, WA (US)

(72) Inventor: Dana Smith, Dana Point, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 363 days.

(21) Appl. No.: 15/198,040

(22) Filed: Jun. 30, 2016

(65) Prior Publication Data
US 2018/0004183 A1    Jan. 4, 2018

(51) Int. Cl.
| G05D 1/02 | (2006.01) |
| G05B 19/19 | (2006.01) |
| H04B 1/38 | (2015.01) |
| G01S 19/47 | (2010.01) |

(52) U.S. Cl.
CPC .............. G05B 19/19 (2013.01); G01S 19/47 (2013.01); H04B 1/38 (2013.01); *G05B 2219/40082* (2013.01)

(58) Field of Classification Search
CPC ................. G05B 19/19; G05B 2219/40082; H04B 1/38; G01S 19/47
USPC ........................................................ 700/302
See application file for complete search history.

(56) References Cited

U.S. PATENT DOCUMENTS

| 6,088,020 | A | 7/2000 | Mor |
| 6,850,222 | B1 | 2/2005 | Rosenberg |
| 7,239,976 | B2 | 7/2007 | Coleman et al. |
| 7,581,708 | B2* | 9/2009 | Newkirk ............ A61M 16/0051 248/283.1 |
| 8,138,938 | B2 | 3/2012 | Troy et al. |
| 8,583,392 | B2 | 11/2013 | Panagas |
| 8,591,161 | B1 | 11/2013 | Bernhardt |
| 9,074,847 | B1 | 7/2015 | Sullivan et al. |
| 9,575,330 | B2* | 2/2017 | Wagner ................ G02B 27/646 |
| 2007/0020076 | A1* | 1/2007 | Heynssens ............ B60P 1/4435 414/541 |
| 2008/0254416 | A1* | 10/2008 | Claudinon ............. F16M 11/12 434/55 |
| 2016/0028956 | A1 | 1/2016 | Webb et al. |

FOREIGN PATENT DOCUMENTS

WO    WO2015022433    2/2015

* cited by examiner

*Primary Examiner* — Vu A Vu
(74) *Attorney, Agent, or Firm* — ScienBiziP, PC

(57) ABSTRACT

A system and method are presented for docking an actively stabilized platform. The platform includes an active stabilizing mechanism selectively engageable to orient the platform in at least a first axis of rotation. Once the docking procedure is initiated, a docking device engages the platform to prevent rotation in the first axis. When the docking device becomes fixedly engaged with the platform, the active stabilizing mechanism can be disengaged and the platform sustained in a first orientation defined by the first axis of rotation. In addition, the method may sustain the platform aligned in a first spatial position defined by at least two orthogonal axes. Similarly, if the docking device does not provide complete stability for the platform (i.e., engages the platform with a tolerance error), the active stabilizing mechanism can be partially engaged to minimize the tolerance error while minimizing power consumption.

12 Claims, 6 Drawing Sheets

SYSTEM AND METHOD FOR DOCKING AN ACTIVELY STABILIZED PLATFORM

BACKGROUND OF THE INVENTION

1. Field of the Invention

This invention generally relates to stabilization mechanisms and, more particularly, to a docking system and method for minimizing the expenditure of energy in an actively stabilized platform.

2. Description of the Related Art

A common application for Inertial Measurement Units (IMUs) is to provide feedback in an electromechanical gimbal system used to stabilize a platform, for example, one carrying a video imaging device. During the initialization of this system it is commonly necessary to orient the platform to a desired initial pose and hold it steady during the initialization of the sensing and control circuits. Currently this operation requires either placing the platform on a level stable surface or handholding the platform.

Depending on the physical scale involved (sizes, masses), a fair amount of power is required to maintain position. An actively stabilized gimbal typically uses brushless DC motors on each axis. These motors force-balance a permanent magnet rotor between two sets of electromagnet stators, as A and B phases. This requires some level of current to flow at all times, whether changing position to compensate for motion-induced movement, or simply to fix a given position.

It would be advantageous if IMU initialization could be automated, which is of particular utility in systems where manual adjustment is unfeasible.

It would be advantageous if a normal orientation pose could be held in a fixed manner, so that electromechanical system actuator power could be significantly reduced or eliminated when circumstances permit.

It would be advantageous if a fixed pose for a stabilized platform could be maintained, to assist in the correlation of a platform pose to a reference frame, such as the pose of a robot or autonomous vehicle, where the reference frame pose may also be determined by an IMU dataset or data from other sensors.

SUMMARY OF THE INVENTION

Disclosed herein is an electromechanical system that interposes mechanical elements to create a rigid or semi-rigid docking station, whereby a primary electromechanical system (platform) is relieved of active, energy-consuming stabilizing motion control. When controlling logic requests docking of the stabilizing platform, an actuator moves into position a docking platform. The docking platform includes a self-aligning latch mechanism, which secures the position of the mating stabilizing platform as the docking platform moves closer. Once the docking platform has travelled the full distance to properly mate with the stabilizing platform latch receivers, the docking actuator is de-energized. With mechanical stability now provided by the docking platform, controlling logic can direct the stabilizing circuit to de-energize, or reduce power, to the motors normally used to provide stabilizing motion to the stabilized platform. In a reverse process, the undocking of the stabilized platform may be effected. Additionally, the gimbal system and stabilized platform are protected from spurious motion when the gimbal is not energized but is subject to kinetic forces while on a moving platform or in transit in any manner.

Accordingly, a method is presented for docking an actively stabilized platform. The method provides a platform including an active stabilizing mechanism selectively engageable to orient the platform in at least a first axis of rotation. The method also provides a docking device. Once the docking procedure is initiated the docking device engages the platform to prevent rotation in at least the first axis. When the docking device becomes fixedly engaged with the platform, the active stabilizing mechanism can be disengaged and the platform sustained in a first orientation defined by the first axis of rotation. In addition, the method may sustain the platform aligned in a first spatial position defined by at least two orthogonal axes. If the docking device does not provide complete stability for the platform engages the platform with a tolerance error), the active stabilizing mechanism can be partially engaged to minimize the tolerance error while minimizing power consumption.

In one aspect, the docking device located at the first position and the platform has embedded locomotion mechanism capable of transversely moving the platform in at least two orthogonal directions. Then, the docking device engages the platform when the locomotion mechanism moves the platform to the first position. If the platform includes an embedded locating system, platform locating system may determine the position of the platform with respect to the docking device and direct the platform locomotion mechanism to move the platform to the first position. Some elements of a locating system include an inertial measurement unit (IMU), global positioning satellite (GPS) receiver, camera with visual odometry software, a transceiver or communications system to communicate position information between the platform and the docking device, an ultrasonic ranging device, a laser detection and ranging (LiDAR) device, infrared ranging device, and combinations of the above-listed devices. In one aspect, the docking device has the locating system, which determines position information of the platform location with respect to the docking device location, and communicates the position information to the platform. Then, the platform locomotion mechanism moves the platform to the first position in response to the position information.

Alternatively, the docking device includes an embedded locomotion mechanism capable of transversely moving the docking device in at least two orthogonal directions. If the platform is already located at the first position, the docking device locomotion mechanism moves the docking device to the first position. In one aspect, the platform has an embedded locating system that determines position information of the platform location with respect to the docking device location, and communicates the position information to the docking device. Then, the docking device locomotion mechanism moves the docking device in response to the position information. If the docking device has the locating system, it determines the position of the platform with respect to the docking device, and directs the docking device locomotion mechanism to move the docking device to the first position.

Additional details of the above-described method and of a system for docking an actively stabilized platform are presented below.

DETAILED DESCRIPTION

Figure 1:
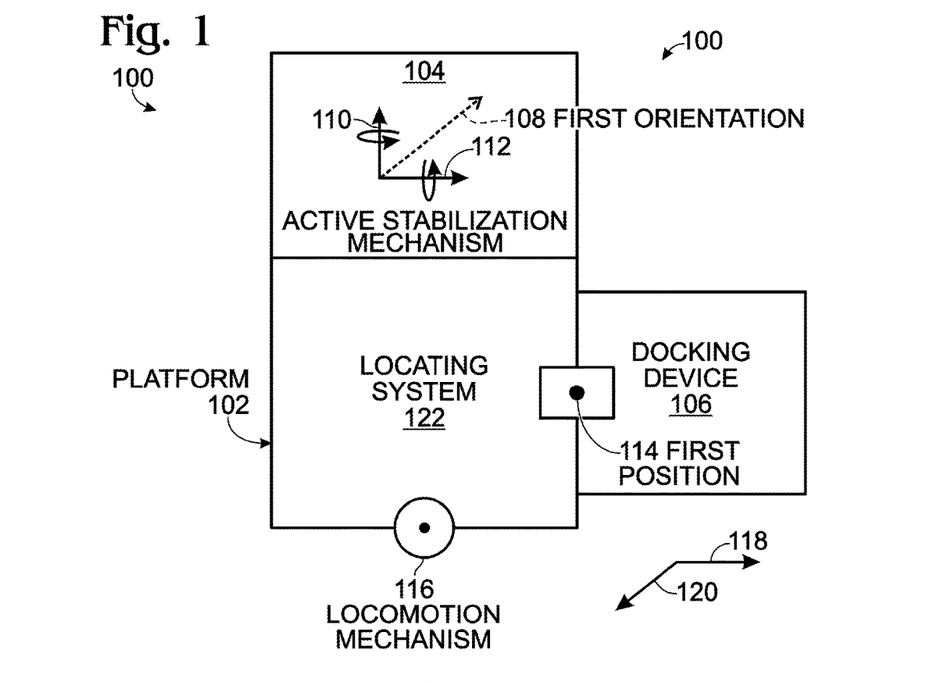
FIG. 1 is a schematic block diagram of a system for docking an actively stabilized platform.

FIG. 1 is a schematic block diagram of a system for docking an actively stabilized platform. The system 100 comprises a platform 102 and an active stabilizing mechanism 104 embedded with the platform, selectively engageable to control platform alignment. For example, the platform may house a camera, and the active stabilization mechanism may be a system of gimbals used to align the camera lens in a particular orientation (i.e., point the lens in a particular direction). A docking device 106 sustains the platform 102 in a first orientation, as represented by axis 108, when fixedly engaged with the platform. As used herein, "fixedly engaged" defines the prevention of rotation, translation, or both, and displacement in general, typically using a plurality of contact points as a latching mechanism.

In one aspect, the active stabilizing mechanism 104 is capable ting the platform 102 in at least two orthogonal axes of rotation, rotational axes 110 and 112. The active stabilization mechanism 104 is at least partially disengaged when the docking device is fixedly engaged with the platform. That is, the docking device 106 maintains platform 102 in the first orientation when engaged. In one aspect, the docking device 106 sustains the platform 102 in a first spatial position 114 when fixedly engaged with the platform. If the docking device 106 is not able to completely sustain the platform 102 in the first orientation or first position, it may be sufficient to at least partially disengage the active stabilization mechanism 104, which enables the active stabilization mechanism to be at least partially disengaged, as defined by energy usage or time of engagement.

In one aspect, the docking device 106 is initially located at the first position 114 (i.e., the desired platform position). A locomotion mechanism, represented by wheel 116, is embedded with the platform 102 capable of transversely moving the platform in at least two orthogonal directions 118 and 120 to the first position 114. A locomotion mechanism 116 is any means for moving the platform 102, examples of which include wheels, gears, lifts, motors, cables, etc. If the first position 114 is not known, or if the platform 102 does not "know" its initial position with respect to the first position, it may further comprise embedded location system 122 for determining the position of the platform with respect to the docking device and directing the locomotion mechanic 116 to move the platform to the first position.

Some examples of a locating system 122 include an inertial measurement unit IMU and global positioning satellite (GPS) receiver, which would permit the platform 102 to at least determine its own position. In this aspect, the use of an IMU or GPS receiver would additionally require that the platform receive docking device (first) position information. For example, the docking device may include a GPS receiver and a wireless transmitter to broadcast it position, as determined by the GPS receiver, to the platform. Other location system examples include a camera with visual odometry software, a transceiver or communications system to communicate position information between the platform and the docking device, an ultrasonic ranging device, a laser detection and ranging (LiDAR) device, infrared ranging device, and combinations of the above-listed devices.

Figure 2:
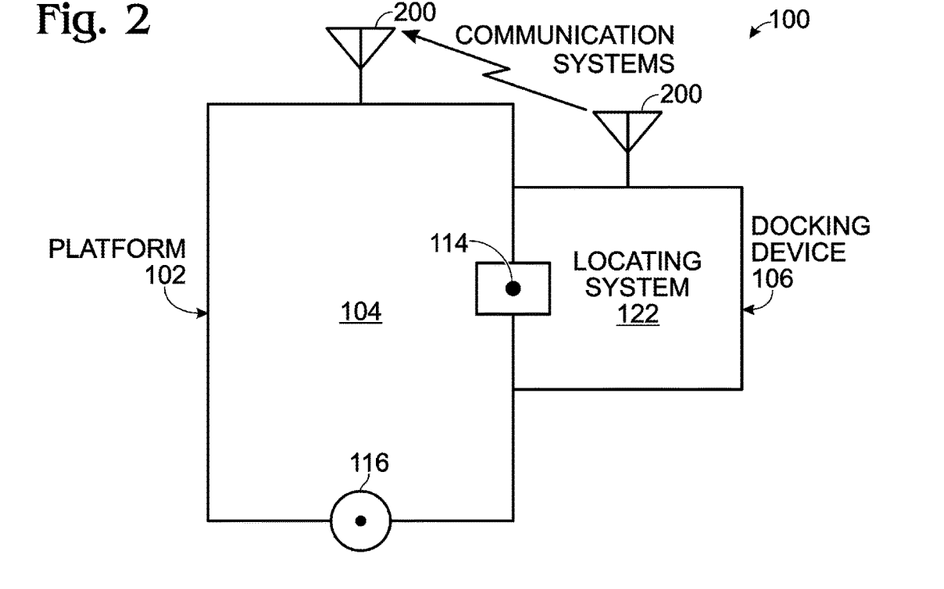
FIG. 2 is a schematic block diagram depicting a first variation of the system described by FIG. 1.

FIG. 2 is a schematic block diagram depicting a first variation of the system described by FIG. 1. In this aspect, the location system 122 is embedded with the docking device 106, for determining the position of the platform 102 with respect to the docking device. A communications system 200 embedded in the docking device 106 (transmitter) and platform 102 (receiver) communicates position information from the docking device to the platform. As a result, the locomotion mechanism 116 is directed to move the platform 102 to the first position 114 in response to the position information.

Figure 3:
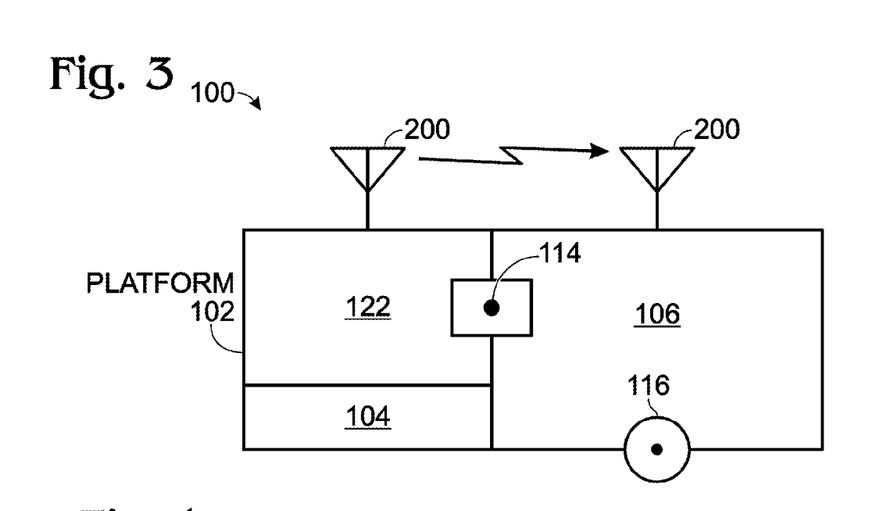
FIG. 3 is a schematic block diagram depicting a second variation of the system described by FIG. 1.

FIG. 3 is a schematic block diagram depicting a second variation of the system described by FIG. 1. In this aspect, the platform 102 is initially located at a first position 114. That is, the platform is located in the desired position. A locomotion mechanism 116 is embedded with the docking device 106 capable of transversely moving the docking device in at least two orthogonal directions to the first position 114. A location system 122 is embedded with the platform 102 for determining the position of the platform with respect to the docking device. A communication system 200 is embedded in the platform 102 (transmitter) and docking device 106 (receiver) for communicating position information from the platform to the docking device. As a result, the locomotion mechanism 116 moves the docking device 106 to the first position 114 in response to the position information.

Figure 4:
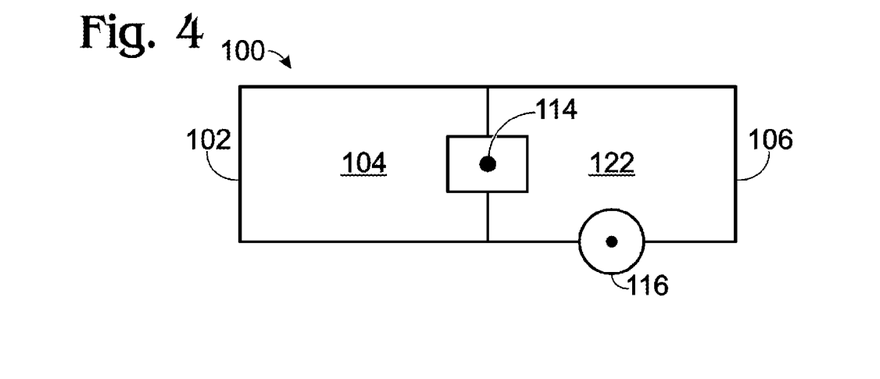
FIG. 4 is a schematic block diagram depicting a variation of the system described by FIG. 3.

FIG. 4 is a schematic block diagram depicting a variation of the system described by FIG. 3. In this aspect, the location system 122 is embedded with the docking device 106 for determining the position of the platform 102 with respect to the docking device. The locating system 122 directs the locomotion mechanism 116 to move the docking device 106 to the first position 114.

The above-described systems are applicable to stabilizing gimbal mechanisms most commonly operating in two or three axes to stabilize a platform. One common application is to use the stabilized platform as the carrier for a video camera. Another application would be an open container for liquids, ranging in scale from a simple spoon to an industrial crucible for chemicals or molten metal. The first two axes are typically a pitch axis—a forward and backward tilting motion axis—and a roll axis—a side to side tilting axis. The third axis is a yaw, or rotational axis for the entire stabilizing gimbal. Such stabilizing gimbals could also offer some translational movement compensation along any or all of the aforementioned axes if required.

For a three-axis gimbal, the above-described systems employ a docking device mechanism located in the vicinity of the platform in its disengaged state and which moves to close proximity or direct contact to specific portions of the platform in the engaged state. When disengaged the docking device is sufficiently separated in space so as to not interfere with the gimbal platform as it moves on any of the axes.

Figure 5A:
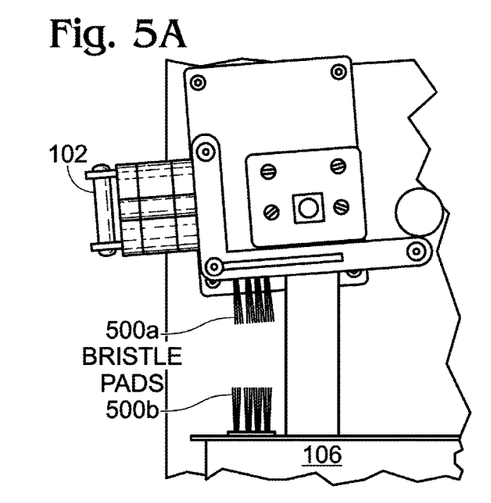
FIGS. 5A through 5C depict an example of a platform mounted camera at a first position, engaging a docking device.
Figure 5B:
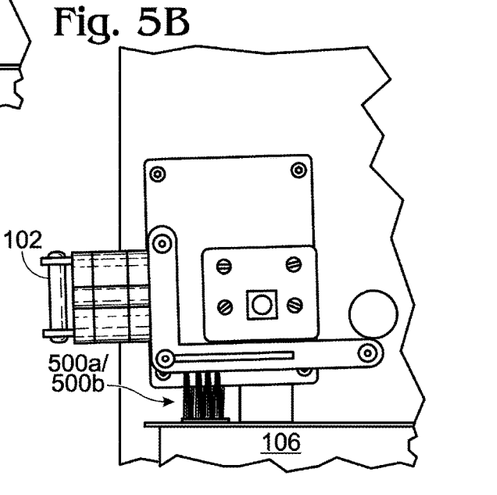
Figure 5C:
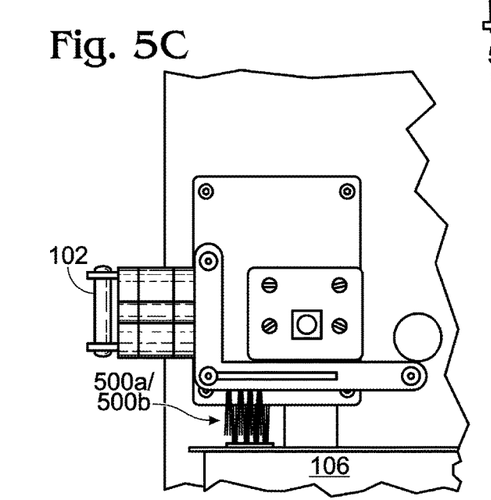

FIGS. 5A through 5C depict an example of a platform mounted camera at a first position, engaging a docking device. In this example, the docking device (dock) 106 has contact points equipped with a bristle pad 500b. In the disengaged lowered state (FIG. 5A) the dock is out of the motion envelope of the gimbal above it. When raised up the dock's bristle pad 500b mates with a corresponding pad 500a affixed to the underside of the stabilized platform 102 (FIG. 5B). The bristles have sufficient flexibility to bend if tip-to-tip contact occurs and thus let opposing bristles slide past each other. As the bristles are bundled at the end point, interleaved bristles 500a/b eventually are forced into intimate contact along a greater extent of length (FIG. 5C). This in turn reduces the flexibility as a shorter length is free to bend, which increases the rigidity of the column of interleaved bristles.

In this prototypical assembly, the dock is actuated using a crank mechanism driven by a motor under the control of a microprocessor. Limit switches are used to establish the extent of travel along a supporting pedestal for the dock. The prototypical assembly utilizes a 3-axis gimbal.

Figure 6:
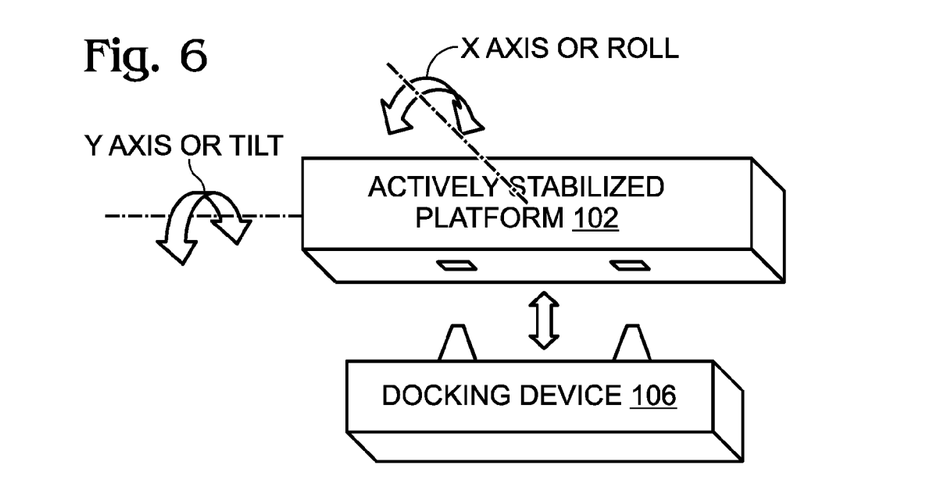
FIG. 6 is a diagram depicting a general design for a platform with a 2-axis active stabilization mechanism.

FIG. 6 is a diagram depicting a general design for a platform with a 2-axis active stabilization mechanism. Individual axis docking components are mechanically designed to operate independently of the other axes, such that it is possible to dock and unlock each axis as desired. The actuating component related to a docked axis may be placed in a low-energy consumption state or powered off.

Figure 7:
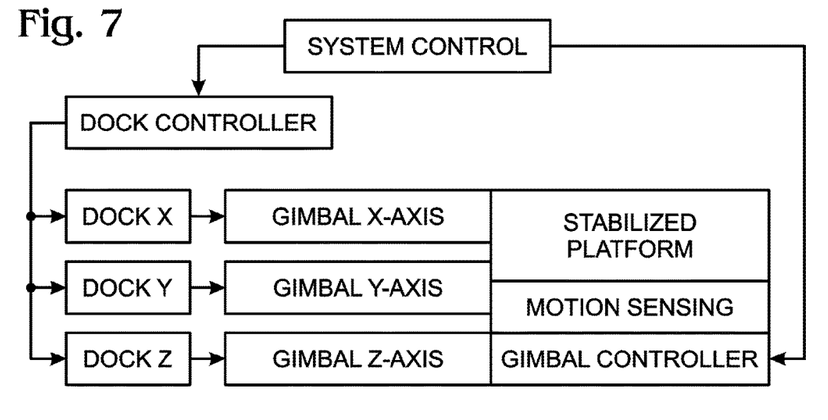
FIG. 7 is a diagram depicting higher level control mechanisms.

FIG. 7 is a diagram depicting higher level control mechanisms. The dock controller in its simplest form responds to a command to report docking status, actuate the docking process, or actuate the un-docking process. Message error handling and other typical system communications processes such as message validity are implicit. A dock controller or platform controller may incorporate elements of an automated computing system, such as hardware, firmware, a combination of hardware and software, software, software stored on a computer-readable medium, or software in execution. Such computer systems typically employ a bus or other communication mechanism for communicating information, and a processor coupled to the bus for processing information. The computer system may also include a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with initiating a docking procedure, locating, and moving. The control of these functions may be enabled using software applications stored in non-transitory memory or a computer-readable medium comprised of a sequence of processor executable steps. Alternately, some of these functions may be performed in hardware. The practical implementation of such a computer system would be well known to one with skill in the art, and details of a conventional computer are not described herein in the interest of brevity.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Figure 8:
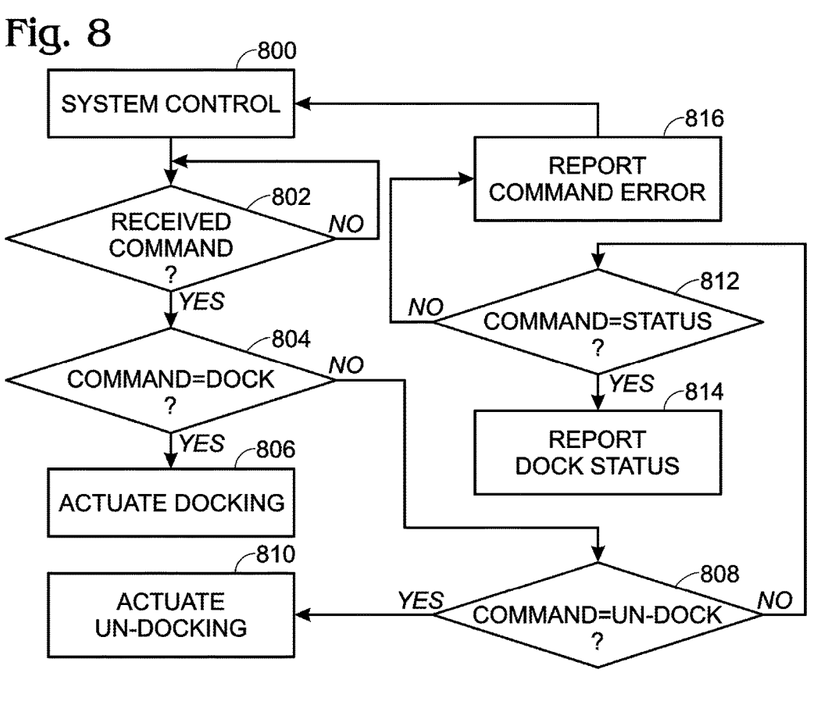
FIG. 8 is a flowchart illustrating a method for controlling the docking device.

FIG. 8 is a flowchart illustrating a method for controlling the docking device. System control is initiated in Step 800. Step 802 determines if a command is received. If yes, Step 804 determines if the command is a docking command. If yes, docking is actuated in Step 806. If the answer in Step 804 is no, Step 808 determines if the command is an undocking command. If yes, undocking is actuated in Step 810. If the answer n Step 808 is no, Step 812 determines if the command is a status update command. If yes, Step 814 reports docking device status. If the answer in Step 812 is no, Step 816 reports a command error.

Returning to FIG. 7, system control also communicates with the gimbal controller as timing requires, to throttle up or down gimbal axis power based on dock status. In an alternative embodiment, the docking aspect may encompass a more elaborate mechanical design that includes moving components that connect not only to the stabilized platform but also to individual axis mechanics. Taper pins are driven by actuators to couple pitch, roll, and if present, yaw gimbal arms to a surrounding gantry brought into proximity. The resulting mechanical interconnection offers greater resistance to motion in all of the affected axes. This improves the pose of each gimbal axis, improves the rigidity of the system, and provides better motion damping for calibration procedures. If active stabilization is not required, stabilizing motors may be placed in a low-energy state or powered off.

In another variation, the platform and dock bristle pads are replaced by conical pins and mating conical receivers. One or more of such pins and receivers cause alignment to a fixed position. Such pins or receivers may also have magnetic properties to further enhance the mechanical interconnection strength while avoiding excess pressure against the gimbal platform and hearing system.

Figure 9:
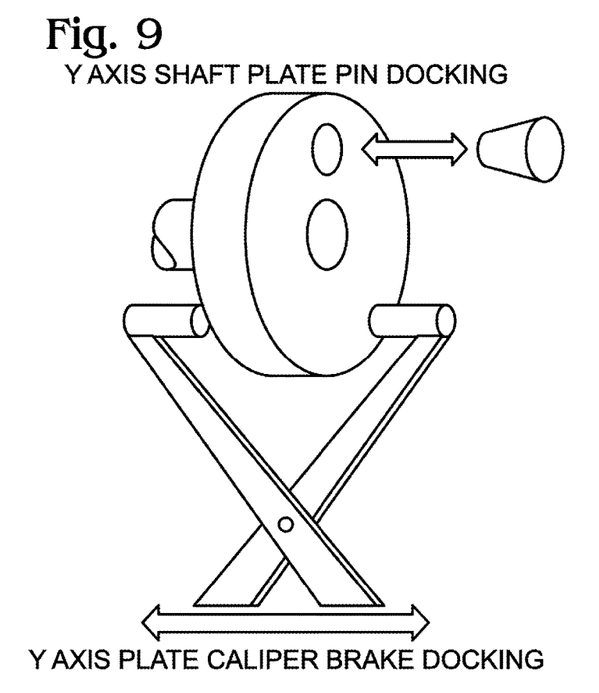
FIG. 9 depicts a docking component (mechanical interconnection) as a pin and receiver, or as a motor shaft either directly or a disk affixed thereon as illustrated.

FIG. 9 depicts a docking component (mechanical interconnection) as a pin and receiver, or as a motor shaft either directly or a disk affixed thereon as illustrated. A caliper brake, rotary bolt, or similar mechanism may be used to immobilize the axis. The docking component may also use a gimbal frame member. In addition, interlocking mechanical components such as conical pins or receivers may be made of or include elastomer constituents which provide shock-absorbing properties to reduce vibration and damp transfers of kinetic energy while the platform is docked.

If a variable-force braking method, such as caliper disc brakes or edge shoes are used as the mechanical interconnect, brake drag force is employed to dampen external force position shifts, and is coordinated with motor force to maintain position close to a desired position. In conditions of extreme external forces, which may be sensed by the IMUs associated with axis position control, a brake hold-release sequence synchronized to motor power increase and decrease is used to reduce overall motor power consumption.

Figure 10:
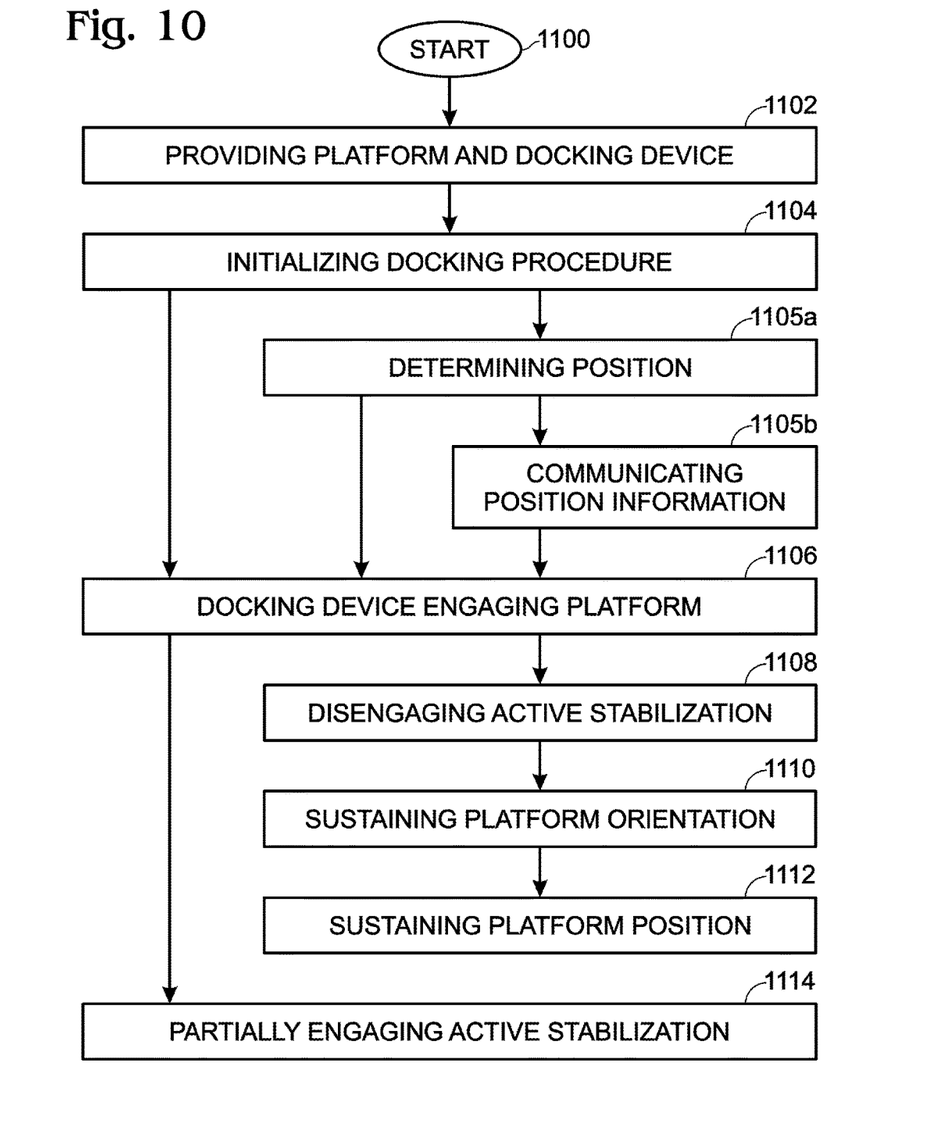
FIG. 10 is a flowchart illustrating a method for docking an actively stabilized platform.

FIG. 10 is a flowchart illustrating a method for docking an actively stabilized platform. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1100.

Step 1102 provides a platform including an active stabilizing mechanism selectively engageable to orient the platform in at least a first axis of rotation. The platform may, alternatively, be oriented in two or three orthogonal axes of rotation. Step 1102 also provides a docking device. Step 1104 initiates a docking procedure. In Step 1106 the docking device engages the platform to prevent rotation in at least the first axis. If the docking device becomes fixedly engaged with the platform, Step 1108 disengages the active stabilizing mechanism. Step 1110 sustains the platform in a first orientation defined by the at least the first axis of rotation. In one aspect, Step 1112 sustains the platform aligned in a first spatial position defined by at least two orthogonal axes. If the docking device is not completely stable itself, or does not fixedly engage the platform (i.e., engages the platform with a tolerance error), Step 1114 partially engages the active stabilizing mechanism to minimize the tolerance error.

In one aspect, Step 1102 provides the docking device located at the first position, and also provides the platform with an embedded locomotion mechanism capable of transversely moving the platform in at least two orthogonal directions. Then, the docking device engaging the platform (Step 1106) includes the platform locomotion mechanism moving the platform to the first position. Further, if Step 1102 provides the platform with an embedded locating system, in Step 1105*a* the platform locating system determines the position of the platform with respect to the docking device. Then, in Step 1106 the platform locating system directs the platform locomotion mechanism to move the platform to the first position. Some examples of a locating system include an IMU, GPS receiver, camera with visual odometry software, a transceiver or communications system to communicate position information between the platform and the docking device, an ultrasonic ranging device, a LiDAR device, infrared ranging device, and combinations of the above-listed devices. In one aspect, Step 1102 provides the docking device with an embedded locating system. Then in Step 1105*a* the docking device locating system determines position information of the platform location with respect to the docking device location, and in Step 1105*b* the docking device communicates the position information to the platform. In Step 1106 the platform locomotion mechanism moves the platform to the first position in response to the position information.

Alternatively, Step 1102 may provide the docking device with an embedded locomotion mechanism capable of transversely moving the docking device in at least two orthogonal directions. If the platform is located at the first position, then in Step 1106 the docking device locomotion mechanism moves the docking device to the first position. Further, if Step 1102 provides the platform with an embedded locating system, in Step 1105*a* the platform locating system determines position information of the platform location with respect to the docking device location, and in Step 1105*b* the platform communicates the position information to the docking device. Then, in Step 1106 the docking device locomotion mechanism moves the docking device in response to the position information. In a variation, if Step 1102 provides the docking device with an embedded locating system, in Step 1105*a* the docking device locating system determines the position of the platform with respect to the docking device, and in Step 1106 the docking device locating system directs the docking device locomotion mechanism to move the docking device to the first position.

A system and method have been provided for docking a platform with an active stabilization mechanism. Examples of particular message structures, processors, and hardware units have been presented to illustrate the invention. However, the invention is not limited to merely these examples. Other variations and embodiments of the invention will occur to those skilled in the art.

I claim:

1. A method for docking an actively stabilized platform, the method comprising:
    providing a platform including an active stabilizing mechanism selectively engageable to orient the platform in at least a first axis of rotation, and providing a docking device;
    initiating a docking procedure;
    the docking device engaging the platform to prevent rotation in at least the first axis;
    when the docking device becomes fixedly engaged with the platform, disengaging the active stabilizing mechanisms;
    sustaining the platform in a first orientation defined by the first axis of rotation;
    sustaining the platform aligned in a first spatial position defined by at least two orthogonal axes;
    wherein providing the docking device includes providing a docking device located at the first spatial position;
    wherein providing the platform includes providing the platform with an embedded locomotion mechanism capable of transversely moving the platform in at least two orthogonal directions;
    wherein the docking device engaging the platform includes the platform locomotion mechanism moving the platform to the first spatial position;
    wherein providing the platform further includes providing platform with an embedded locating system, the platform locating system determining the position of the platform with respect to the docking device; and
    wherein the docking device engaging the platform further includes the platform locating system directing the platform locomotion mechanism to move the platform to the first spatial position.

2. The method of claim 1 wherein the platform locating system is selected from a group consisting of an inertial measurement unit (IMU), global positioning satellite (GPS) receiver, camera with visual odometry software, a transceiver system to communicate position information between the platform and the docking device, an ultrasonic ranging device, a laser detection and ranging (LiDAR) device, infrared ranging device, and combinations of the above-listed devices.

3. The method of claim 1 wherein providing the docking device includes providing the docking device with an embedded locating system;
    the method further comprising:
    the docking device locating system determining position information of the platform location with respect to the docking device location;
    the docking device communicating the position information to the platform; and
    wherein the docking device engaging the platform includes the platform locomotion mechanism moving the platform to the first spatial position in response to the position information.

4. The method of claim 1 further comprising: when the docking device engages the platform a tolerance error, partially engaging the active stabilizing mechanism to minimize the tolerance error.

5. A method for docking an actively stabilized platform, the method comprising:
  providing a platform including an active stabilizing mechanism selectively engageable to orient the platform in at least a first axis of rotation, and providing a docking device;
  initiating a docking procedure;
  the docking device engaging the platform to prevent rotation in at least the first axis;
  when the docking device becomes fixedly engaged with the platform, disengaging the active stabilizing mechanisms;
  sustaining the platform in a first orientation defined by the first axis of rotation;
  sustaining the platform aligned in a first spatial position defined by at least two orthogonal axes;
  wherein providing the docking device includes providing a docking device with an embedded locomotion mechanism capable of transversely moving the docking device in at least two orthogonal directions;
  wherein providing the platform includes providing the platform located at the first spatial position;
  wherein the docking device engaging the platform includes the docking device locomotion mechanism moving the docking device to the first spatial position;
  wherein providing the platform further includes providing the platform with an embedded locating system, the platform with the embedded locating system determining position information of the platform location with respect to the docking device location, and communicating the position information to the docking device; and
  wherein the docking device locomotion mechanism moving the docking device to the first spatial position includes the docking device locomotion mechanism moving the docking device in response to the position information.

6. A method for docking an actively stabilized platform, the method comprising:
  providing a platform including an active stabilizing mechanism selectively engageable to orient the platform in at least a first axis of rotation, and providing a docking device;
  initiating a docking procedure;
  the docking device engaging the platform to prevent rotation in at least the first axis;
  when the docking device becomes fixedly engaged with the platform, disengaging the active stabilizing mechanisms;
  sustaining the platform in a first orientation defined by the first axis of rotation;
  sustaining the platform aligned in a first spatial position defined by at least two orthogonal axes;
  wherein providing the docking device includes providing a docking device with an embedded locomotion mechanism capable of transversely moving the docking device in at least two orthogonal directions;
  wherein providing the platform includes providing the platform located at the first spatial position;
  wherein the docking device engaging the platform includes the docking device locomotion mechanism moving the docking device to the first spatial position;
  wherein providing the docking device further includes providing a docking device with an embedded locating system;
  the method further comprising:
  the docking device locating system determining the position of the platform with respect to the docking device; and
  wherein the docking device engaging the platform further includes the docking device locating system directing the docking device locomotion mechanism to move the docking device to the first spatial position.

7. A system for docking an actively stabilized platform, the system comprising:
  a platform;
  an active stabilizing mechanism embedded with the platform, selectively engageable to control platform alignment;
  a docking device to sustain the platform in a first orientation when fixedly engaged with the platform;
  wherein the active stabilization mechanism is at least partially disengaged when the docking device is fixedly engaged with the platform;
  wherein the docking device sustains the platform in a first spatial position when fixedly engaged with the platform;
  wherein the docking device is located at the first spatial position;
  a locomotion mechanism embedded with the platform capable of transversely moving the platform in at least two orthogonal directions to the first spatial position; and
  a location system embedded with the platform for determining the position of the platform with respect to the docking device and directing the locomotion mechanism to move the platform to the first spatial position.

8. The system of claim 7 wherein the active stabilizing mechanism embedded with the platform is capable of orienting the platform in at least two orthogonal axes of rotation.

9. The system of claim 7 wherein the locating system is selected from a group consisting of an inertial measurement unit (IMU), global positioning satellite (GPS) receiver, camera with visual odometry software, a transceiver system to communicate position information between the platform and the docking device, an ultrasonic ranging device, a laser detection and ranging (LiDAR) device, infrared ranging device, and combinations of the above-listed devices.

10. The system of claim 7 further comprising:
  a location system embedded with the docking device for determining the position of the platform with respect to the docking device;
  a communications system embedded in the docking device and the platform for communicating position information from the docking device to the platform; and
  wherein the locomotion mechanism is directed to move the platform to the first spatial position in response to the position information.

11. A system for docking an actively stabilized platform, the system comprising:
  a platform;
  an active stabilizing mechanism embedded with the platform, selectively engageable to control platform alignment;
  a docking device to sustain the platform in a first orientation when fixedly engaged with the platform;
  wherein the active stabilization mechanism is at least partially disengaged when the docking device is fixedly engaged with the platform;

wherein the docking device sustains the platform in a first spatial position when fixedly engaged with the platform;

wherein the platform is located at the first spatial position; the system further comprising:

a locomotion mechanism embedded with the docking device capable of transversely moving the docking device in at least two orthogonal directions to the first spatial position;

a location system embedded with the platform for determining the position of the platform with respect to the docking device;

a communication system embedded in the platform and docking device for communicating position information from the platform to the docking device; and wherein the locomotion mechanism moves the docking device to the first spatial position in response to the position information.

12. The system of claim 11 further comprising:

a location system embedded with the docking device for determining the position of the platform with respect to the docking device, and directing the locomotion mechanism to move the docking device to the first spatial position.

* * * * *